Figure 6:
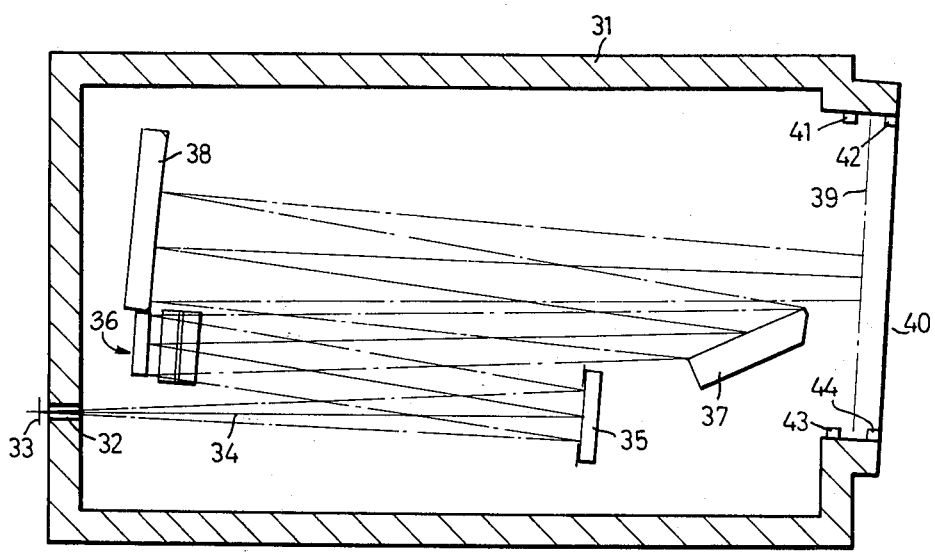

United States Patent [19]
Danielsson et al.

[11] 3,922,089
[45] Nov. 25, 1975

[54] APPARATUS AND METHOD FOR THE UNIFORM SEPARATION OF SPECTRAL ORDERS

[76] Inventors: Nils Allan Danielsson, Angsvagen 7, Sollentuna; Karl-Peter Christian Lindblom, Axvagen 77, Jarfalla, both of Sweden

[22] Filed: Mar. 14, 1973

[21] Appl. No.: 340,980

[30] Foreign Application Priority Data
Mar. 17, 1972 Sweden.............................. 3451/72

[52] U.S. Cl.................. 356/74; 350/162 R; 356/79; 356/99
[51] Int. Cl.² .......................................... G01J 3/18
[58] Field of Search................. 356/79, 74, 96–101; 350/162 R, 168

[56] References Cited
UNITED STATES PATENTS
| | | | |
|---|---|---|---|
| 2,948,185 | 8/1960 | Ward et al...................... | 356/101 X |
| 3,625,615 | 12/1971 | Wilson........................... | 356/101 X |
| 3,658,423 | 4/1972 | Elliott................................ | 356/98 |
| 3,728,029 | 4/1973 | Hirschfeld........................ | 356/98 X |

*Primary Examiner*—Paul A. Sacher
*Assistant Examiner*—F. L. Evans
*Attorney, Agent, or Firm*—Fleit & Jacobson

[57] ABSTRACT

A method and apparatus by which spectral orders produced by a main grating are separated and focused on a focal surface of restricted size, using a combination of grating and prism for the separation of spectral orders, which provides for a relatively uniform spacing of the spectral orders over the entire wave length range within the restricted focal surface.

5 Claims, 8 Drawing Figures

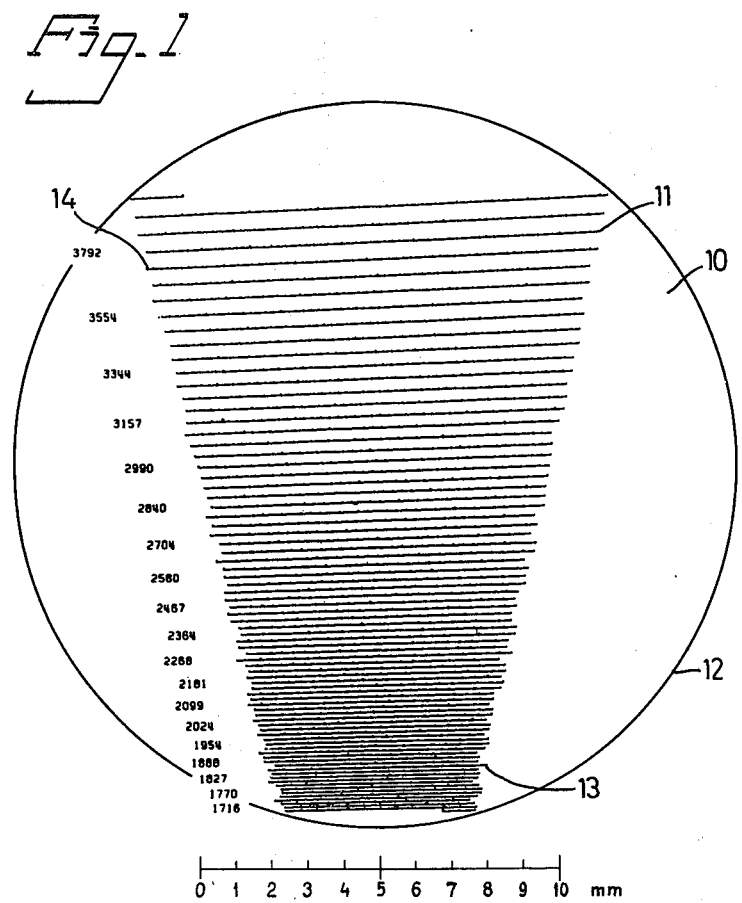

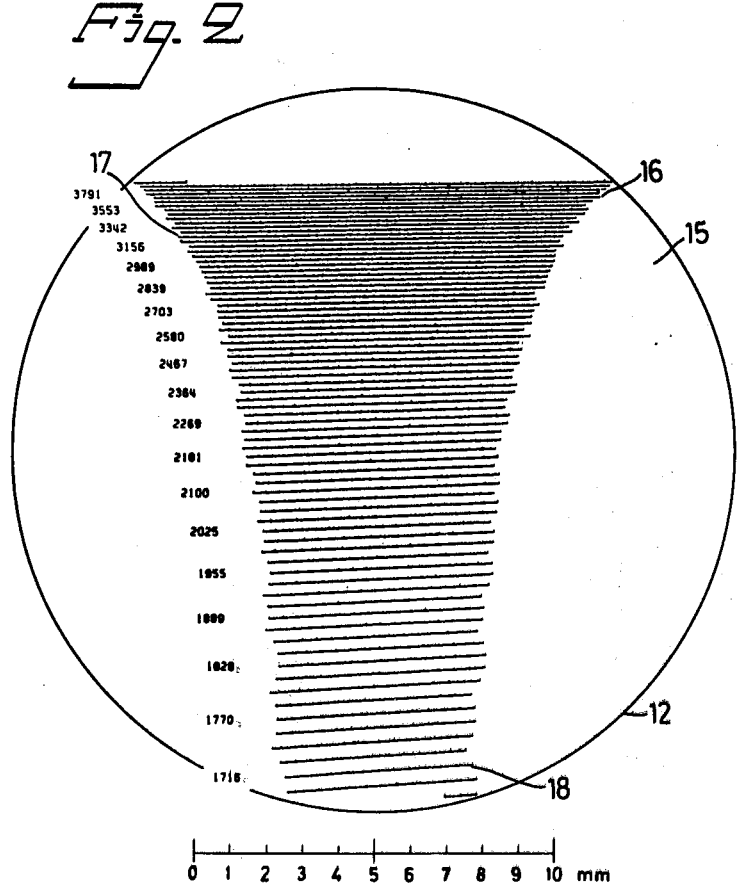

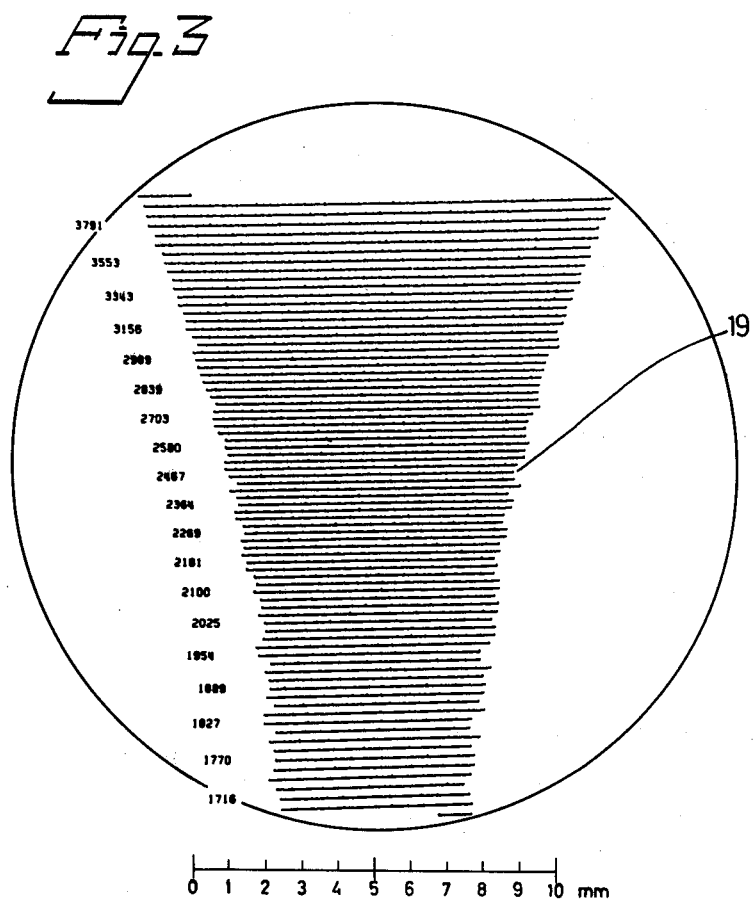

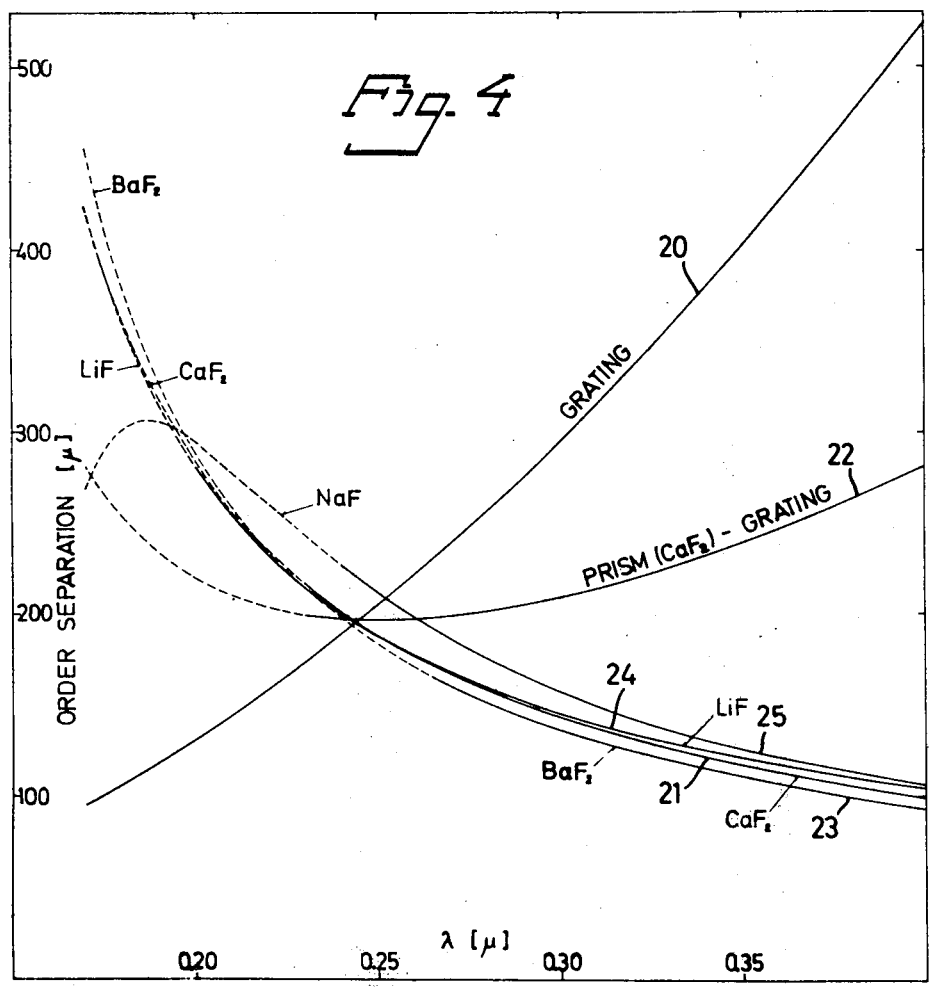
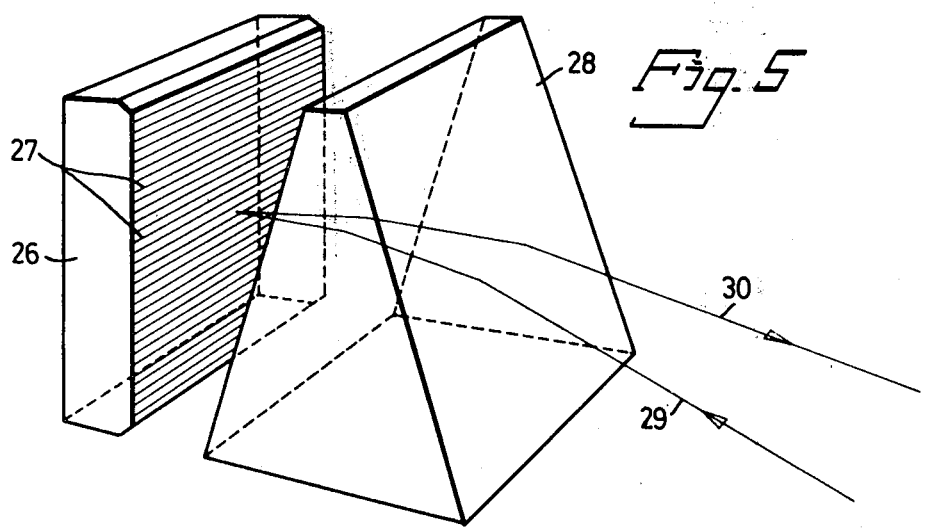

APPARATUS AND METHOD FOR THE UNIFORM SEPARATION OF SPECTRAL ORDERS

The present invention relates to a method associated with the performance of spectral analysis with separation of the spectral orders.

It is known in the performance of spectral analysis to use gratings for the dispersion of radiation in wave lengths. These gratings generate spectra in a plurality of spectral orders which overlap each other. For the purpose of separating the spectral orders from each other, there is inserted in the path of the beam of radiation a further wave length dispersing element which produces a wave length dispersion at an angle to the aforementioned wave length dispersion of the so-called main grating. This latter dispersion is normally designated crossed wavelength dispersion and is either provided solely by means of one prism or solely by means of one grating.

With such wave length dispersion, for example in the wave length region of ultraviolet and visible light, a prism produces on a focal surface greater distances between the spectral orders in the short wave length range of the spectrum than in the long wave length range. If a grating is used instead of a prism the effect is the opposite, namely greater distances are produced between the spectral orders in the long wave length range of the spectrum than in the short wave length range.

Consequently, the use of either of these two optical elements results in a non-uniform distribution of the spectral orders on said focal surface. These two alternatives, however, are acceptable if only a few spectral orders are to be separated.

If, on the other hand, a so-called Echelle-grating for example is used as the main grating for wave length dispersion purposes, a much larger number of spectral orders must be separated. Consequently, if these spectral orders are to be focused on a focal surface of limited size, the two aforementioned alternatives are both unsuitable since the spectral orders in a portion of the focal surface will lie close together while in another portion they will be wider apart.

Accordingly, the object of the invention is to obviate or considerably reduce this disadvantage by providing for a more uniform distribution of the spectral orders on the focal surface.

In accordance herewith the invention is mainly characterized in that on a focal surface the differences in distances between the spectral orders are reduced by multiple wave length dispersion.

The invention also relates to a spectral apparatus for putting the method of the invention into effect, the apparatus being mainly characterized by the fact that at least two wave length dispersion means are arranged in the beam or ray path of the apparatus, said means being selected from the group prism and grating and being intended to provide together the aforementioned reduction in the differences in distances between the spectral orders on the focal surface.

The invention will now be described in more detail with reference to an example thereof illustrated diagrammatically in the accompanying drawing, further features of the invention being disclosed in conjunction therewith.

Figure 7:
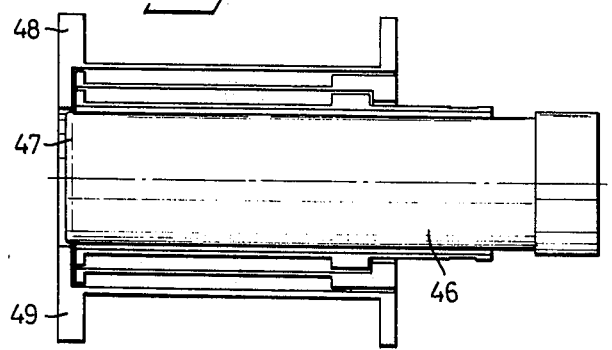
Figure 8:
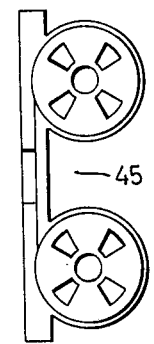

In the drawing:

FIG. 1 is a view of a focal surface, illustrating the distribution of the spectral orders thereon when solely one grating is used for separating the spectral orders, FIG. 2 is a similar view illustrating the distribution of the spectral orders on the focal surface when solely one prism is used for separating the spectral orders, FIG. 3 is a view similar to FIGS. 1 and 2 but showing the distribution of the spectral orders on the focal surface when one grating and one prism combined in accordance with the invention are used for separating the spectral orders, FIG. 4 illustrates graphically the distribution of the spectral orders on the focal surface while using solely one grating, solely one prism of alternative materials and a combination of grating and prism for separating the spectral orders, FIG. 5 is a perspective view of the combination of a grating and a prism according to the invention, placed in series in the beam or ray path, FIG. 6 is a vertical section of a spectrometer according to the invention provided with a combination of grating and prism in series in the beam or ray path, FIG. 7 is an electronic image tube constituting an example of an auxiliary unit for the spectrometer illustrated in FIG. 6, and FIG. 8 is a film cassette arrangement constituting another example of an auxiliary unit for the spectrometer illustrated in FIG. 6.

FIG. 1 is a view of a focal surface 10 in a spectral apparatus equipped with an Echelle-grating as a main grating and with a separate grating for separating the spectral orders. More specifically, the Figure represents a computer calculation of the distribution of the spectral orders 11 on the focal surface with the relevant wave lengths being given in Angstrom units from 1700 to 4000 where one spectral order from the separate grating is used for separating the spectral orders. The scale used in respect of the dimensions of the spectrum is given beneath the Figure. The circle 12 indicates the perimeter of the available focal surface. It is seen from this Figure that the spectral orders in the short wave length portion 13 lie closer together than the spectral orders in the long wave length portion 14, i.e. the spectral orders are non-uniformly distributed on the focal surface. This means that it is difficult when making spectral analysis to separate the spectral orders in the short wave length portion 13 one from the other, hence it is necessary to restrict the wave length range while performing the spectral analysis.

FIG. 2 is a view similar to that of FIG. 1 showing a focal surface 15 in the same spectral apparatus as that used in respect of FIG. 1, the grating for separating the spectral orders, however, being replaced in this case with a prism for the same purpose. As will be seen from FIG. 2, the spectral orders 16 in the long wave length portion 17 lie closer together than the spectral orders in the short wave length portion 18. Thus, the spectral orders are unfavourably distributed and the Figure shows that the same disadvantages are obtained when using the prism in spectral analysis as those obtained with the grating used in connection with FIG. 1, although with the difference that the spectral orders in the long wave length portion are more difficult to separate from each other. The focal surface perimeter 12 is also shown in FIG. 2.

As a study of FIGS. 1 and 2 will show, it is difficult with either alternative to mutually separate the spectral orders in all portions of the spectrum. This does not enable a focal surface of limited size to be utilized to its best advantage, which may be particularly troublesome if, in connection with spectral analysis, photocathodes of electronic image tubes are used as the focal surface, because of their limited size in practice.

Accordingly, the object of the present invention is to provide for a more uniform distribution of the spectral orders on the focal surface so that a larger wave length range can be focused onto a surface of limited size with spectral orders which can be separated one from the other.

This object is achieved by means of the present invention. An explanation of the result achieved by the invention will be given with reference to FIG. 3. As will be seen from this Figure, the spectral orders 19 within the entire wave length range 1700–4000 Angstrom are essentially uniformly distributed and are capable of being separated throughout the whole of the aforementioned wave length range. This is due to the fact that, by means of the present invention it has been possible to utilize the substantially opposite effects of the grating and prism to disperse the spectral orders on the focal surface in increasing spaced apart relationship in opposite directions on said surface. The spectral apparatus used in connection with FIG. 3 is the same apparatus as that used in connection with FIGS. 1 and 2.

FIG. 4 illustrates graphically the separation of the spectral orders as a function of the wave length and refers to the examples illustrated in FIGS. 1–3. In FIG. 4, the curve 20 represents the alternative illustrated in FIG. 1 and shows graphically how the distances between successive spectral orders increase with increasing wave length when using one spectral order from a grating for separating the spectral orders.

Curve 21 in FIG. 4 represents the alternative illustrated in FIG. 2 and shows graphically how the distances between successive spectral orders decrease with increasing wave length when using a prism of calcium fluoride for separating spectral orders.

Curve 22 in FIG. 4 represents the alternative applied in accordance with the present invention and illustrated in FIG. 3, and shows graphically how the differences in distances between spectral orders are reduced over the whole wave length range.

Curve 23 in FIG. 4 represents a prism of barium fluoride, the curve 24 represents a lithium fluoride prism and curve 25 a sodium fluoride prism.

The curve shape for prisms made of different materials and used for separating spectral orders shows that the problem is not solely resolved by a simple exchange of material in the prism.

When establishing the relevant parameters for the combination of grating and prism according to the invention, it is possible in accordance with the invention to optimize the uniformity in the distribution of the spectral orders on the focal surface still further. This is effected in accordance with the invention by selecting the relevant parameters for the prism and grating in a manner such that the distances between successive spectral orders at the longest and the shortest wave lengths are equal in the spectral range, as illustrated by curve 22 in FIG. 4.

The relevant grating parameters are the ruling spacing, the spectral order and the blaze angle. In regard to the prism, the relevant parameters are the material from which the prism is made and its refraction angle. It lies within the purview of the invention to vary the parameters in an arbitrary manner, to achieve the result sought after.

FIG. 5 is a separate view in perspective of the combination grating and prism, in accordance with the invention. The reference numeral 26 indicates generally a plane reflection grating, one side of which is ruled, as shown at 27. The reference numeral 28 indicates in the same Figure a transparent prism produced from calcium fluoride, lithium fluoride, sodium fluoride, quartz etc. The invention is not restricted to these materials, however, but may be applied with other optical materials suitable in the present context. In the diagrammatically shown embodiment, the beam or rays are incident from the prism side and are reflected against the grating subsequent to passing through the prism, from which grating the beam or rays pass again through the prism. The reference numeral 29 in FIG. 5 indicates an incident monochromatic ray, while the reference numeral 30 indicates the same ray subsequent to refraction and diffraction.

Although FIG. 5 shows that the prism is located in front of the grating as seen in the path of the incident beam or ray this arrangement is not restrictive to the invention, since the order can be reversed. In this latter instance a transmission grating of a known type in principle is used, i.e. a grating with which the beam or ray path passes therethrough, and the grating is combined with a prism of, for example, the Littrow-type, i.e. a prism having one reflecting side. In addition to the aforementioned gratings, other types of gratings may also be used in connection with the invention, such as for example concave gratings, so-called holographic gratings etc.

It also lies within the purview of the invention to use several combinations of gratings and prisms, when such an application is desirable.

FIG. 6 illustrates diagrammatically and in longitudinal section a spectral apparatus according to the invention. The reference numeral 31 indicates generally the apparatus casing which has at 32 an opening for the beam or ray 34 entering via an entrance slit 33. Inside the casing, the beam or ray impinges on a concave mirror 35 and is reflected thereby against a prism-grating combination 36, e.g. a prism-grating combination of the type more clearly shown in FIG. 5. The beam or ray is scattered from the prism-grating combination 36 against a main grating 37, e.g. a so-called Echelle-grating, which scatters the beam or ray onto a concave mirror, which in turn focuses the beam or ray onto a focal plane or a focal surface shown by the line 39. Used in conjunction with the focal surface 39 is suitably a filter (not shown) for eliminating disturbing spectral orders from the grating in the aforementioned prism-grating-combination 36.

It will be perceived from the aforegoing that the beam or ray incident from the entrance slit 33 is collimated by the concave mirror 35, the bunch of rays or beam striking the combined prism-grating member 36. The beam exiting therefrom has obtained a wave length dispersion in said member at right angles to the plane of the paper. The thus scattered beam strikes the main grating 37, where a wave length dispersion takes place in the plane of the paper. The scattered beam impinges on the concave mirror 38, which focuses the beam on the focal surface 39 to a spectrum having, in accordance with the invention, an essentially uniform distribution of the spectral orders within a limited area.

As will be seen in FIG. 6, the casing 31 has at its front end an exit opening 40 in which guide rails 41–44 are arranged, for example by means of which a sight plate can be inserted in the focal plane. Alternatively, a photographic plate may be used instead of a sight plate, or — when it is desired to pass a film through the apparatus — a film cassette arrangement of the type shown at 45 in FIG. 8 can be mounted in the guide rails.

The fact that, by means of an apparatus of the type illustrated generally in FIG. 6, it is possible to distribute the spectral orders at least generally uniformly within a focal surface of limited size is of extreme advantage in the case of photo-electrically recorded spectral analysis using image tubes. An example of such an arrangement with image tubes is illustrated in FIG. 7, where the tube is shown generally at 46. The line 47 in FIG. 7 shows the photocathode of the tube. The entire unit 46 is intended to be inserted between respective guide rails 41–44 in the apparatus casing in FIG. 6 by means of the guide means 48 and 49, so that the photocathode 47 coincides with the focal surface 39 in the same Figure.

The invention is not restricted to the illustrated and described embodiments thereof, but can be varied within the scope of the following claims. For example, the above description has been made with reference to the wave length dispersion in series in respect of a single beam or ray. The invention can also be applied, however, when the beam is divided up into at least two sub beams, the described method of the invention being applied individually for each such sub beam.

The apparatus used in conjunction herewith comprises in principle a multiple arrangement of the afore-described, single apparatus for the desired number of sub beams.

What we claim is:

1. A spectral apparatus for the separation of spectral orders through multiple wave length dispersion, the apparatus comprising in optical sequence: an entry means for receiving rays of incident light, first dispersing means in the form of an optically coacting prism-grating combination for dispersing the wave lengths contained in said incident light, and second dispersing means, the dispersion of which is at an angle to that of the first dispersing means, in the form of a main grating for dispersing the wave lengths contained in such incident light.

2. The apparatus of claim 1, wherein said angle is a right angle.

3. The apparatus of claim 1, further including means for focusing the wave lengths dispersed by said second dispersing means onto a focal plane and a photo-electric image tube positioned in said focal plane.

4. A method for the separation of spectral orders by way of multiple wave length dispersion to reduce the differences in distances of said spectral orders on a focal surface, the method comprising the steps of:
  directing rays of light toward an optically co-acting prism-grating combination;
  dispersing the wave lengths contained in said light using said combination, the dispersion of said prism and said grating being aligned;
  directing said dispersed light toward a grating, the dispersion of which is crossed with the dispersion of said combination; and
  dispersing said light directed from said combination using said grating.

5. The method of claim 4, further including the step of focusing said rays dispersed by said grating onto a focal surface.

* * * * *